US010939181B2

(12) United States Patent
Panje et al.

(10) Patent No.: US 10,939,181 B2
(45) Date of Patent: *Mar. 2, 2021

(54) SYSTEMS AND METHODS FOR IN-HOME AND ON-THE-GO TARGETED CONTENT DELIVERY

(71) Applicant: Google Technology Holdings LLC, Mountain View, CA (US)

(72) Inventors: Krishna Prasad Panje, Bangalore (IN); Prasad A G, Bangalore (IN); Azimul Mannan, Darjeeling (IN); Krishnan Raghavan, Bangalore (IN)

(73) Assignee: Google Technology Holdings LLC, Mountain View, CA (US)

( * ) Notice: Subject to any disclaimer, the term of this patent is extended or adjusted under 35 U.S.C. 154(b) by 109 days.

This patent is subject to a terminal disclaimer.

(21) Appl. No.: 16/042,174

(22) Filed: Jul. 23, 2018

(65) Prior Publication Data
US 2018/0332363 A1 Nov. 15, 2018

Related U.S. Application Data

(63) Continuation of application No. 15/284,277, filed on Oct. 3, 2016, now Pat. No. 10,034,063, which is a (Continued)

(51) Int. Cl.
H04N 7/10 (2006.01)
H04N 7/025 (2006.01)
(Continued)

(52) U.S. Cl.
CPC ..... H04N 21/812 (2013.01); H04N 21/23424 (2013.01); H04N 21/2402 (2013.01);
(Continued)

(58) Field of Classification Search
CPC ............. H04N 21/812; H04N 21/2668; H04N 21/2402; H04N 21/23424;
(Continued)

(56) References Cited

U.S. PATENT DOCUMENTS 7,634,785 B2   12/2009  Smith
8,887,040 B2 * 11/2014  Ray ................... H04L 29/06027
                                              715/253

(Continued)

FOREIGN PATENT DOCUMENTS

EP          2393244        12/2011
WO     WO 2003053056       6/2003

OTHER PUBLICATIONS

Chave, P., "Digital Splicing", In Broadcast Engineering, May 1, 2007, pp. 1-4, available at: http://license.icopyright.net/user/viewfreeuse.act?fuid=MTQzMDk3NDA%3D.
(Continued)

Primary Examiner — Mulugeta Mengesha
Assistant Examiner — Alazar Tilahun
(74) Attorney, Agent, or Firm — Byrne Poh LLP

(57) ABSTRACT

A method and apparatus for streaming content is disclosed. A streamer (155) detects a cue for a break in a segment of the program content, wherein the cue includes an identification of an advertising provider associated with the break. The streamer sends, to an advertisement server (115), a request for content associated with the advertising provider, and receives, from the advertisement server, an advertisement associated with the advertising provider. Further, the streamer transcodes the advertisement based on configuration information of an additional device (165) to generate formatted content viewable on the additional device. Moreover, the streamer streams the formatted content to the additional device via the local connection.

21 Claims, 5 Drawing Sheets

Related U.S. Application Data continuation of application No. 13/326,568, filed on Dec. 15, 2011, now Pat. No. 9,462,328.

(51) Int. Cl.

| | | |
|---|---|---|
| *H04N 21/436* | (2011.01) | |
| *H04N 21/41* | (2011.01) | |
| *H04N 21/4363* | (2011.01) | |
| *H04N 21/4402* | (2011.01) | |
| *H04N 21/45* | (2011.01) | |
| *H04N 21/81* | (2011.01) | |
| *H04N 21/44* | (2011.01) | |
| *H04N 21/234* | (2011.01) | |
| *H04N 21/24* | (2011.01) | |
| *H04N 21/2668* | (2011.01) | |

(52) U.S. Cl.
CPC ..... *H04N 21/2668* (2013.01); *H04N 21/4126* (2013.01); *H04N 21/43615* (2013.01); *H04N 21/43637* (2013.01); *H04N 21/4402* (2013.01); *H04N 21/44008* (2013.01); *H04N 21/4516* (2013.01); *H04N 21/4532* (2013.01)

(58) Field of Classification Search
CPC ....... H04N 21/44008; H04N 21/43615; H04N 21/4532; H04N 21/4516; H04N 21/4402; H04N 21/43637; H04N 21/4126
USPC ..................................................... 725/32–36
See application file for complete search history.

(56) References Cited

U.S. PATENT DOCUMENTS

| | | | |
|---|---|---|---|
| 2002/0087402 A1 | 7/2002 | Zustak et al. | |
| 2004/0034874 A1 | 2/2004 | Hord et al. | |
| 2005/0204393 A1 | 9/2005 | Bopardikar et al. | |
| 2006/0282319 A1 | 12/2006 | Maggio | |
| 2007/0022442 A1 | 1/2007 | Gil et al. | |
| 2007/0283384 A1* | 12/2007 | Haeuser ............. | H04N 21/2668 725/34 |
| 2008/0181225 A1 | 7/2008 | Zampiello | |
| 2008/0195468 A1 | 8/2008 | Malik | |
| 2008/0255686 A1 | 10/2008 | Irvin et al. | |
| 2008/0320543 A1* | 12/2008 | Wang ..................... | H04N 7/162 725/131 |
| 2009/0265734 A1 | 10/2009 | Dion et al. | |
| 2010/0269138 A1 | 10/2010 | Krikonan et al. | |
| 2011/0295981 A1 | 12/2011 | Damola et al. | |
| 2012/0316965 A1 | 12/2012 | Mathews et al. | |
| 2013/0024888 A1 | 1/2013 | Sivertsen | |

OTHER PUBLICATIONS

Ellis, L., "The Dynamics of Dynamic VOD Ads", Jan. 29, 2007, pp. 1-2, available at: http://www.translation-please.com/print.cfm?columnid=185.

Ellis, L., "Local-into-Digital Ad Splicing: Part 2", Jun. 2, 2003, pp. 1-2, available at: http://www.translation-please.com/print.cfm?columnid=150.

Examination Report dated Nov. 19, 2015 in EP Patent Application No. 12795958.3.

International Preliminary Report on Patentability dated Jun. 17, 2014 in International Patent Application No. PCT/US2012/065408.

International Search Report dated Jun. 20, 2013 in International Patent Application No. PCT/US2012/065408.

Notice of Allowance dated Mar. 27, 2018 in U.S. Appl. No. 15/284,277.

Notice of Allowance dated Jun. 2, 2016 in U.S. Appl. No. 13/326,568.

Office Action dated May 7, 2013 in U.S. Appl. No. 13/326,568.

Office Action dated Jun. 3, 2014 in U.S. Appl. No. 13/326,568.

Office Action dated Aug. 17, 2017 in U.S. Appl. No. 15/284,277.

Office Action dated Aug. 18, 2017 in CN Patent Application No. 201280069337.7.

Office Action dated Sep. 9, 2013 in U.S. Appl. No. 13/326,568.

Office Action dated Sep. 9, 2015 in U.S. Appl. No. 13/326,568.

Office Action dated Dec. 3, 2014 in U.S. Appl. No. 13/326,568.

Office Action dated Dec. 19, 2016 in CN Patent Application No. 201280069337.7.

Written Opinion dated Jun. 17, 2014 in International Patent Application No. PCT/US2012/065408.

\* cited by examiner

SYSTEMS AND METHODS FOR IN-HOME AND ON-THE-GO TARGETED CONTENT DELIVERY

CROSS-REFERENCE TO RELATED APPLICATION

This application is a continuation of U.S. patent application Ser. No. 15/284,277, filed Oct. 3, 2016, which is a continuation of U.S. patent application Ser. No. 13/326,568, filed Dec. 15, 2011, each of which is hereby incorporated by reference herein in its entirety.

TECHNICAL FIELD

This application generally relates to content delivery, and more particularly to platforms and techniques for streaming alternate advertisement content to a set of devices.

BACKGROUND

With the advent of digital televisions, set-top boxes (STBs), digital video recorders (DVRs), and media delivery systems such as Internet Protocol television (IPTV) and Video on Demand (VOD), a content consumer has various options to view multimedia content. For example, the consumer can view a program as it is broadcasted or can record the program for later viewing. In addition, some cable and telecom companies incorporate targeted content delivery into broadcast content. For example, the cable and telecom companies, along with their customers, can target different groups of consumers with different targeted content, such as different advertisements.

However, there are shortcomings in current techniques. In particular, cable and telecom companies employ targeted advertisements on a per STB (or similar component) basis, without considering that other users may be viewing the targeted advertisements. Further, the targeted advertisements themselves are sent to the STB (or similar component) directly from the back-end servers, thereby increasing network load. Moreover, when content is recorded and the recorded content is played back many times on a device, the same (or different) users are presented with the same advertisement many times.

Accordingly, there is an opportunity for more efficient and effective targeted advertising.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

DETAILED DESCRIPTION

Figure 1:
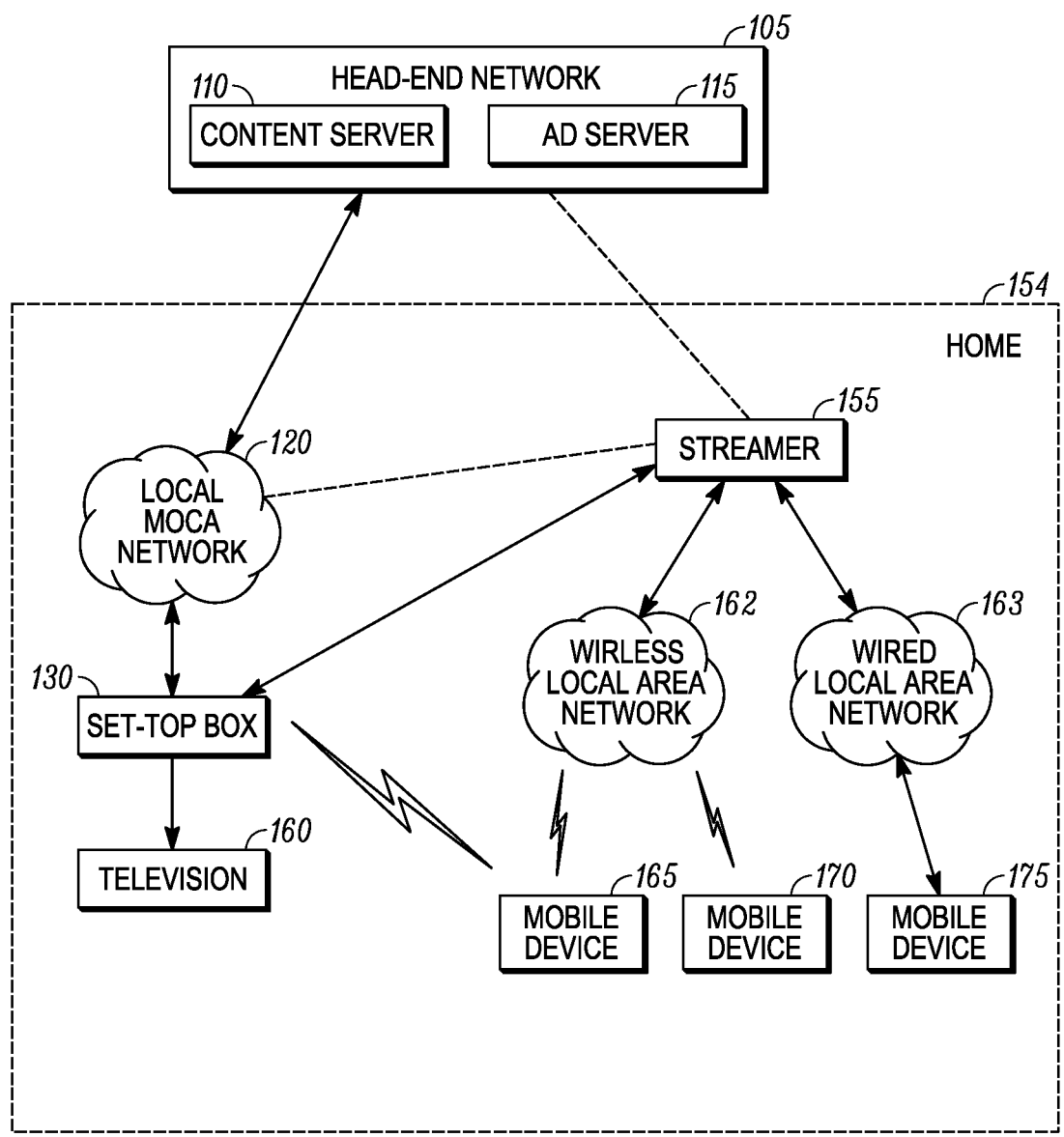
FIG. 1 is a block diagram of an exemplary content delivery environment in accordance with some embodiments.

A method and apparatus for a communication device in a communication system provides individualized target content delivery in a local area network environment. A set-top box (STB) monitors program content for a cue for a splice point or advertisement opportunity and indicates the splice point, as well as an advertising provider associated with the cue, to the communication device. In addition, the method and apparatus requests content associated with the advertising provider from a head-end ad server, and the head-end ad server provides a relevant advertisement to the communication device. The method and apparatus transcodes the program content and the relevant advertisement based on configuration information of an additional device and streams the transcoded content from the communication device to the additional device. A user of the additional device can view the streaming content on the additional device.

The apparatus and method as discussed herein can offer many improvements to existing content delivery techniques. For example, advertisers can use advertisement slots more efficiently and effectively by individually targeting multiple users of a local area network, such as a wireless local area network (WLAN), within a household or work area. In particular, existing head-end servers employ targeted advertisements that assume there is only one user per STB or similar component. In contrast, according to the apparatus and method as discussed herein, when an STB of a household is showing particular content from an advertiser, a streamer device can be used to enable one or more users accessing locally-networked devices in the household to watch alternate, sometimes preferred, content on their devices. In addition, the streamer device can transcode multiple content streams (e.g., via interleaved processing) for multiple locally-networked devices (e.g., devices being used by different members of a household).

In addition, a streamer device at a user premises such as a household can transcode content to be streamed to mobile devices based on configuration and specification data of the mobile devices. In contrast, head-end servers of existing systems cannot transcode data for compatibility with mobile devices because the head-end servers are not aware of the capabilities of the mobile devices. Further, in existing systems, alternate advertisements need to be multiplexed as different components or channels in a cable signal, which requires significant bandwidth availability. In the systems and methods as discussed herein, the streamer can connect to a remote ad server and retrieve the advertisement content to transcode and stream to a mobile device, which saves bandwidth because alternate content need not be multiplexed during transport.

The apparatus and method as discussed herein can further offer flexibility as well as tailored content. In particular, the advertisements can be selected at the ad server based on user interest or preference, as well as based on the advertising provider itself, and the best matching content can be selected. Further, new content can be added by or sourced from partner websites or other entities without the need to add the new content to a channel map or component at the head-end server. Still further, the streamer device can store or otherwise queue additional or alternate advertisements for later consumption by users, such as when a user watches content recorded on a DVR or when a mobile device connects to the streamer device via a local connection. As such, the streamer device can provide different advertisements to different users while the users watch recorded content or when users are connected to the streamer device.

As used herein, a "cue for a splice point" can be understood to be any type of cue tone or insertion in content that can indicate a break in the content such as, for example, an advertisement. The cue can include metadata with any type of associated information, such as an advertising provider associated with the advertisement, a length of the advertisement, a product being advertised, and/or other information. In some cases, the splice point itself can also include the metadata, and can have associated "splice-in" and "splice-out" points. Further, as used herein, an "advertising provider" can be understood to be any type of entity having a product, service, cause, and/or the like to advertise or otherwise promote.

FIG. 1 illustrates a block diagram of an exemplary content delivery environment 100. It should be appreciated that each of the components of the environment 100 can have one or multiple entities. The environment 100 includes a head-end network 105 with a content server 110 and an ad server 115. For example, the head-end network 105 can be a multiple system operator (MSO) network configured to operate one or more television systems and provide digital wideband communication services through agreements with television stations and other entities.

The content server 110 can use any type of hardware, software, and combinations thereof configured to transmit or otherwise provide programming content to end users. Further, the ad server 115 can use any type of hardware, software, and combinations thereof configured to transmit or otherwise provide advertisement content to end users. For example, the content server 110 can provide content from network television programs to the end users, and the ad server 115 can provide advertisement content from advertising providers to the end users, to be inserted at various points in the broadcast of the network television programs.

The head-end network 105 and components thereof can be configured to splice advertisement content into a video content stream. More particularly, a splicing component of the head-end network 105 can monitor content from the content server 110 to detect a splice point that signifies a break in the content. When a splice point is detected, the splicing component can link pre-established packet identifiers (PIDs) corresponding to advertisement segments from the ad server 115 to the content. After the advertisement segments are linked, the head-end network 105 can provide an uninterrupted spliced stream of programming and advertisements to customers.

The environment 100 further includes a local Multimedia over Coax Alliance® (MoCA) network 120. In particular, the head-end network 105 can transmit programming content and advertisement content to devices in a customer's home network 154, such as a set-top box (STB) 130 and other devices, via the MoCA network 120. It should be appreciated that the local MoCA network 120 can be any type of local area network (LAN), wide area network (WAN), or other network operating pursuant to any communication protocol.

As shown in FIG. 1, the local MoCA network 120 and associated components can reside within the home network 154 and/or similar premises. In particular, the home network 154 can include the local MoCA network 120, the STB 130, and a streamer 155. In embodiments, the streamer 155 can be any device or component using hardware, software, and/or a combination thereof, and the streamer 155 can be separate from the STB 130 or can be a component within the STB 130. The MoCA network 120 can be configured to connect to the STB 130 and the streamer 155 via coaxial connection(s), wireless connection(s), or other connections, such as via a local area network.

The STB 130 can be configured to provide content to a television 160 or similar display device such as a monitor, and the streamer 155 can be configured to provide content to one or more mobile devices 165, 170, 175 via a local area network, such as a wireless local area network (WLAN) 162 or a wired local area network 163 or another type of network such as a wireless personal area network (e.g., a Bluetooth® network). It should be appreciated that the mobile device 165 can be any hardware device or component capable of connecting to the streamer 155 and outputting audio and/or video content. For example, the mobile device 170 can be a mobile phone, a tablet device, a notebook computer, and/or the like. In some cases, the mobile device 175 can be a gaming console, handheld gaming device, or similar components.

The STB 130 can be configured to communicate with the streamer 155, and vice-versa, via a set of tuners, ports, or other components. According to implementations, the streamer 155 can be configured to connect to the local MoCA network 120, the STB 130, and/or the head-end network 105 to deliver or otherwise facilitate the delivery of alternate or different content to the set of mobile devices 165, 170, 175. For example, the content that the streamer 155 provides each mobile device 165, 170, 175 can be different from the content that the STB 130 provides to the television 160. For further example, the streamer 155 can provide alternate or different content to each of the set of mobile devices 165, 170, 175. Moreover, the content can be advertisements that can originate from one or more advertising providers.

The streamer 155 can be configured to provide the alternate or different content at concurrent or varied times. Further, the streamer 155 can select the alternate or different content based on configuration or specification data associated with each mobile device 165, 170, 175, user preference data or user demographic data associated with each user of the mobile devices 165, 170, 175, other data, and/or combinations thereof. For example, the configuration data of the mobile devices 165, 170, 175 can include data relating to display screen size, communication protocols, compatible media formats or associated media applications, and/or other specifications. Examples of user preference data can include whether the user has indicated that he or she likes action movies (rather than romantic movies), motorcycles (rather than sedans), dining at restaurants (more than dining at home or grocery shopping), and the user's preferred language. User demographic data can include the user's indicated age range (e.g., under 13, 14-17, 18-22, 23-35, 36-50, over 51), the user's gender (male or female), the user's race or cultural heritage, etc.

In some cases, mobile devices 165, 170 can be "paired" or otherwise connected to the streamer 155 via, for example, the wireless local area network 162 or other networks such as a wireless personal area network (e.g., a Bluetooth® network), wherein the streamer 155 can receive the configuration or specification data associated with the mobile devices 165, 170 upon pairing.

The STB 130 can monitor for or otherwise detect a cue for a splice point in the content received from the head-end network 105. For example, the cue can signify the commencement of an upcoming advertisement from an advertising provider and can include metadata identifying the advertising provider. In some cases, the STB 130 can have an ad client or similar module installed thereon that can store or access user preferences and/or user demographics of users associated with the home network 154 and components thereof. For example, the user preferences and/or demographic information can be gathered or received via users operating the television 160 and/or the mobile devices 165, 170, 175. In embodiments, the cue for a splice point can be detected in content playback from a DVR. For example, a user can record a program on a DVR device incorporated in or separate from the STB 130, and the splice point can be detected by the STB 130 when the recorded program is later played back by the DVR.

Upon detection of the splice point, the STB 130 can provide an identification of the advertising provider to the streamer 155. For example, the STB 130 can provide the metadata including the advertising provider identification or just the advertising provider identification to the streamer 155. In some cases, the ad server 115 can provide, to the STB 130, packet identifier(s) (PID) such as uniform resource identifier (URI) component(s) corresponding to one or more advertisements, and the STB 130 can provide the received PIDs or URI components to the streamer 155. Further, in some cases, the STB 130 can provide a notification of the advertisement directly to a mobile device 165 if, for example, the mobile device 165 is paired directly to the STB 130. More particularly, the notification of the advertisement to the streamer 155 can be merely a notification, a notification with an identification of the advertising entity, or a notification with a PID, URI, or similar component.

After the streamer 155 receives the identification of the advertising entity, the streamer 155 can connect to the ad server 115 of the head-end network 105 to request advertisement content associated with the advertising provider. In some cases, the streamer 155 can provide the ad server 115 with configuration or specification information of the mobile devices 165, 170, 175, user preference data, user demographic data, and/or other data. In response to receiving the request from the streamer 155, the ad server 115 can select one or more relevant advertisements from the advertising provider that match the request. For example, if the advertising provider is a car manufacturer, then the ad server 115 can select an advertisement for a sedan for one mobile device 170 and an advertisement for a sport utility vehicle (SUV) for another mobile device 175. Meanwhile, the car manufacturer's default advertisement for a coupe will be shown on the television 160. The ad server 115 can be configured to provide indications or references (e.g., URIs or others) of the one or more selected advertisements to the streamer 155. In some embodiments, if the STB 130 provides the indication(s) or reference(s) (e.g., URIs or others) to the streamer 155 directly, then the streamer 155 need not request advertisement content from the ad server 115.

The streamer 155 can be configured to transcode or otherwise convert the received content or references based on the configuration and specification information of each of the mobile devices 165, 170, 175. For example, if the mobile device 165 has a 1024-by-768-pixel resolution at 132 pixels per inch (ppi), then the streamer 155 can transcode the content such that the transcoded content is compatible with or otherwise configured to display on the mobile device 165. It should be appreciated that multiple transcoding techniques are envisioned. In some embodiments, the streamer 155 can apply digital rights management (DRM) techniques, or other encoding techniques, to the data, prior to or subsequent to transcoding the data. For example, the DRM application can be based on rights or access privileges of one or more users of the components of the environment 100.

The streamer 155 can stream or otherwise provide the transcoded content to the appropriate mobile devices of the set of locally-networked mobile devices 165, 170, 175. For example, the set of mobile devices 165, 170, 175 can receive the transcoded content from the streamer 155 via the wireless local area network 162, or other network connections 163. In some situations, a mobile device 165 is running a media application that receives the transcoded program content and targeted content as a single, uninterrupted spliced stream of both programming and advertisements.

Alternately, in some cases, a user of a mobile device 170 can be already tuned to a program being output by the streamer 155, whereby the transcoded content can interrupt the program on the mobile device 170 when a default advertisement interrupts the program output from the STB 130. Thus, the mobile device 170 can receive targeted content from the streamer 155 (instead of the default advertisement) in one stream and program content from the streamer 155 in another stream and splice the two streams together prior to displaying the content.

In other cases, the user of the mobile device 175 can be accessing another application or module of the mobile device 175 and not receive any program content from the STB 130. For example, the user can be playing a game on the mobile device 175 when the streamer 155 is ready to provide the transcoded content to the mobile device 175. In embodiments, software associated with the mobile device 175, such as an operating system or another application, can prompt the user to either allow the transcoded content to be streamed or reject the transcoded content from being streamed. Thus, targeted content can also be sent to the mobile device 175 apart from the program content from the STB 130.

In embodiments, the streamer 155 can be configured to store or buffer the transcoded content if, for example, the appropriate mobile device 165, 170, 175 is not available, is not connected to the wireless local area network 162 or the wired local area network 163, or a user of the mobile device 165, 170, 175 has opted not to receive the transcoded content. Further, the streamer 155 can be configured to transcode and store and/or buffer additional advertisement content associated with the original advertising provider or an additional advertising provider. When the appropriate mobile device 165, 170, 175 is available, connects to the wireless local area network 162 or the wired local area network 163, or a user of the mobile device 165, 170, 175 has opted to receive the transcoded content, the streamer 155 can stream the stored content to the mobile device 165, 170, 175. In some cases, an additional mobile device (not shown) not already in the set of mobile devices 165, 170, 175 can connect to the streamer 155 via, for example, the wireless local area network 162, and the streamer 155 can stream any stored content to the additional mobile device. In some cases, the streamer 155 can obtain the configuration and specification data of the additional mobile device, transcode the stored content as appropriate, and stream the transcoded content to the additional mobile device.

In some cases, the streamer 155 is incorporated as a component of the STB 130, and the STB 130 (with streamer 155 component) can be configured to request advertisement content directly from the ad server 115. For example, the STB 130 can provide configuration and specification data for the mobile device 165 to the ad server 115, which can select and return an appropriate advertisement, and the STB 130 with streamer 155 component can stream the selected advertisement to the mobile device 165 for viewing.

In some cases, there may not be any alternative advertisements available in a given time slot of a particular transport stream or program broadcast. Accordingly, the STB 130, when it detects the cue for a splice point, can indicate the splice point and associated metadata to the streamer 155. If, at a later point in time, an alternative advertisement is available at the ad server 115, the ad server 115 can provide an indication of the alternative advertisement (e.g., a URI) to the streamer 155. For example, the indication can be for a specific alternative advertisement, or the indication can specify the streamer 155 itself and reference different advertisements for the streamer 155 to access at different times, whereby the streamer 155 can select alternative advertisements that match user preferences and/or demographics, that match the configuration and specification data of the set of mobile devices 165, and/or based on other factors. Thus, different targeted content can be inserted at splice points during playback of a recorded program.

Figure 2:
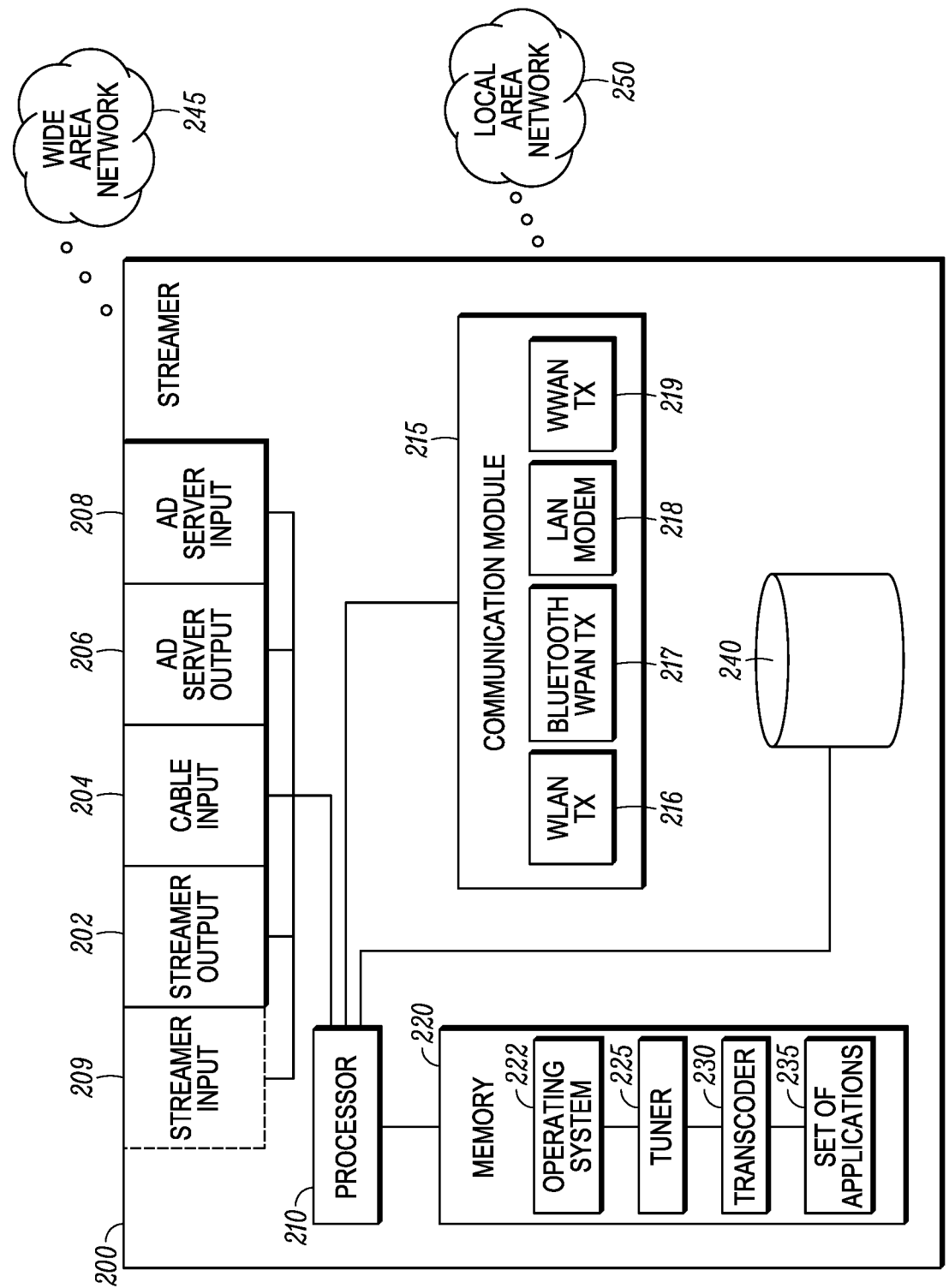
FIG. 2 is a more-detailed block diagram of a communication module in accordance with some embodiments.

FIG. 2 depicts an exemplary streamer 200 and components thereof. It should be appreciated that FIG. 2 represents a generalized schematic illustration and that other components and/or entities can be added or existing components and/or entities can be removed or modified.

As shown in FIG. 2, the streamer 200 can include a set of ports that can receive input signals or data from, or output signals or data to, other components of a content distribution environment, such as the STB 130, the head-end network 105, one or more mobile devices 165, 170, 175, and others, as discussed herein. More particularly, a streamer output port 202 can be configured to send transcoded data, such as transcoded advertisement and/or program content data, to a mobile device such as mobile device 165, 170, 175. Similarly, an optional streamer input port 209 can be configured to receive user preference and/or user demographic data, configuration or specification data for mobile devices, and/or other data. Further, a cable input port 204 can be configured to receive program content and data thereof (e.g., splice point data, advertising provider metadata, etc.) from an STB or other components, such as directly from the local MoCA network 120. Still further, an ad server output port 206 can be configured to send a request to an ad server, such as the ad server 115 as discussed with respect to FIG. 1, for advertising content. Moreover, an ad server input port 208 can be configured to receive, from an ad server, advertisement content to be transcoded and streamed to a mobile device.

The streamer 200 can further include a processor 210 communicating with a memory 220, such as electronic random access memory, or other forms of transitory or non-transitory computer readable storage mediums, operating under control of or in conjunction with an operating system 222. The operating system 222 can be any commercial, open-source, or proprietary operating system or platform. The processor 210 can communicate with a database 240, such as a database stored on a local hard drive. While illustrated as a local database in the streamer 200, the database 240 can be separate from the streamer 200.

The processor 210 can further communicate with a communication module 215, such as a wired or wireless data connection, which in turn communicates with a wide area network 245, such as various public or private networks. More particularly, the wide area network 245 can connect the streamer 200 to a head-end network and components thereof, and/or other components via the ports 206, 208 or the communication module 215. The communication module 215 can include radio transceivers that communicate with a wireless local area network 250 or other networks (e.g., a Bluetooth® wireless personal area network) and/or routers that communicate with a wired local area network. The communication module 215 can include a WLAN transceiver 216, a Bluetooth® WPAN transceiver 217, and a LAN modem 218 that can each connect to the local area network 250. Further, the communication module 215 can include a WWAN transceiver 219 (e.g. cellular or WiMAX) that can connect to the wide area network 245. In some cases, the communication module 215 can include other WWAN connections (not shown in figures) such as a DSL modem, cable modem, or the like, that can also connect to the wide area network 245.

The set of ports 202, 204, 206, 208, 209 of the streamer 200 can use the components of the communication module 215 to connect to one or more mobile devices 165, 170, 175. For example, the ad server input port 208 can receive advertisement content via the WWAN transceiver 219, and the streamer output port 202 can transmit transcoded advertisement content to the mobile device 165 via the WLAN transceiver 216. In some cases, one or more of the ports 202, 204, 206, 209, 209 can bypass the components of the communication module 215. For example, the streamer output port 202 can directly connect to the mobile device 175 via, for example, an RJ45 ethernet cable.

The processor 210 can also communicate with a tuner 225 that can be configured to process signals received by the input ports (e.g., the streamer input port 209 and the cable input port 204). Further, the processor 210 can communicate with a transcoder 230 that can be configured to interface with the tuner 225 and transcode data processed by the tuner 225. Still further, the processor 210 can also communicate with a set of applications 235 that can be configured to execute control logic and perform data processing to perform the functions and techniques as discussed herein. For example, the set of applications 235 can include an encryptor application that can be configured to apply DRM or other encryption techniques to data, and a streaming application that can be configured to stream data to other devices or entities. It should be appreciated that other applications 235 and functionalities are envisioned.

While FIG. 2 illustrates the streamer 200 as a standalone system using a combination of hardware and software, the components of the streamer 200 can also be implemented as a software application or program capable of being executed by a conventional computer platform. Likewise, the components of the streamer 200 can also be implemented as a software module or program module capable of being incorporated in other software applications and programs in, for example, an STB. In either case, the components of the streamer 200 can be implemented in any type of conventional proprietary or open-source computer language.

Figure 3:
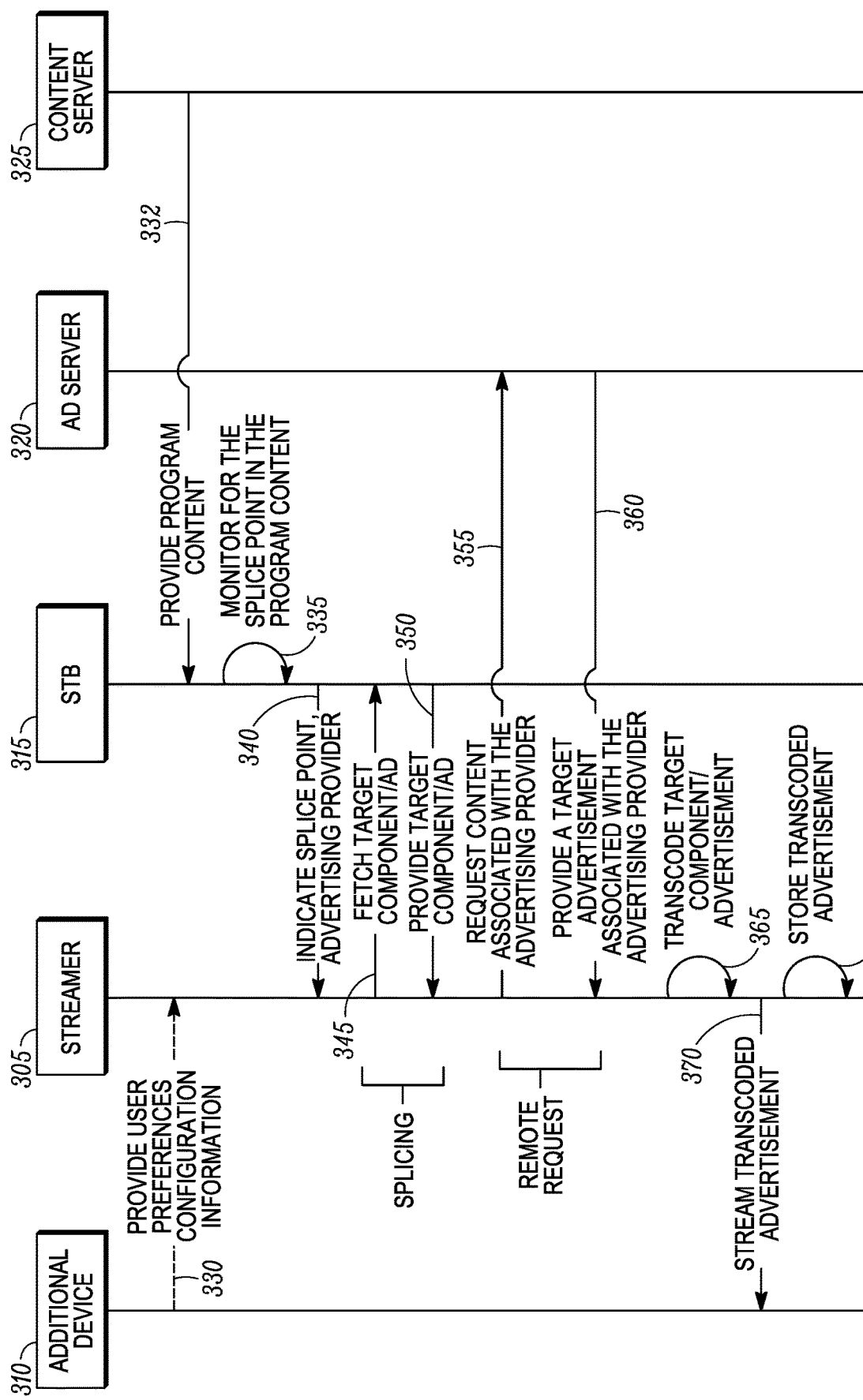
FIG. 3 is a diagram of an exemplary content delivery signaling diagram in accordance with some embodiments.

FIG. 3 is a signaling diagram illustrating some functionalities of the components of the content-streaming environment. As shown in FIG. 3, the environment can include a streamer 305, an additional device 310, an STB 315, an ad server 320, and a content server 325. It should be understood that the functionalities as illustrated in FIG. 3 are merely exemplary, and that other functionalities can be added or existing functionalities can be removed or modified.

As shown in FIG. 3, in optional step 330, the additional device 310 can provide user preferences and/or user demographics and configuration information to the streamer 305. For example, the user preferences and user demographics can relate to a user of the additional device 310 and the configuration information can detail specifications of the additional device 310. It should be appreciated that step 330 can occur at any point in time and the additional device can be a mobile device such as 165, 170, 175 from FIG. 1. In step 332, the content server 325 can provide program content to the STB 315. The program content can have indications for splice points, advertisement metadata, and/or other similar data. In step 335, the STB 315 can monitor for cues for splice points in the program content. For example, the cues can include metadata related to advertisement providers associated with the splice points.

In step 340, the STB 315 can indicate the splice point and the advertising provider to the streamer 305. Optionally, the STB 315 can send the indication directly to the additional device 310. In a case of splicing, the STB 315 can also provide a target ad component identifier, such as in the form of a PID, to the streamer 305. If the STB 315 provides the target ad component identifier, then in step 345, the streamer 305 can fetch the target ad component from the STB 315, which has been received or is being received by the STB 315. In step 350, the STB 315 can provide the target ad component to the streamer 305 in the form of, for example, a web link or other type of URI.

In the case of a remote advertisement request, in step 355, the streamer 305 can request, from the ad server 320, content associated with the advertising provider. More particularly, the streamer 305 can provide an indication of the advertising provider and can optionally provide any user preferences and/or user demographics associated with the additional device 310. In step 360, the ad server 320 can provide a target advertisement component for the associated advertising provider to the streamer 305 in the form of, for example, media data, or a web link or other type of URI.

In step 365, the streamer 305 can transcode the target advertisement component based on the configuration information of the additional device 310 to generate a transcoded advertisement that is viewable on the additional device 310. In step 370, the streamer 305 can stream the transcoded advertisement on the additional device 310. If the additional device 310 is not available, for example if the additional device 310 is not connected via a local network to the streamer 305, then in step 375, the streamer 305 can store the transcoded advertisement in storage, and stream the transcoded advertisement to the additional device 310 when the additional device 310 is available.

In some cases, the streamer 305 can store multiple advertisements to be streamed to multiple additional devices at a later time, based on user preferences and/or demographic information, configuration information, and/or other data. Further, the above processing and functionality can be implemented during playback of stored program content via, for example, a DVR player. In particular, the streamer 305 can be configured to monitor for cues for splice points during playback of the stored program content, fetch and transcode the target ad component, and stream the transcoded advertisement to the additional device 310, as discussed herein.

Figure 4:
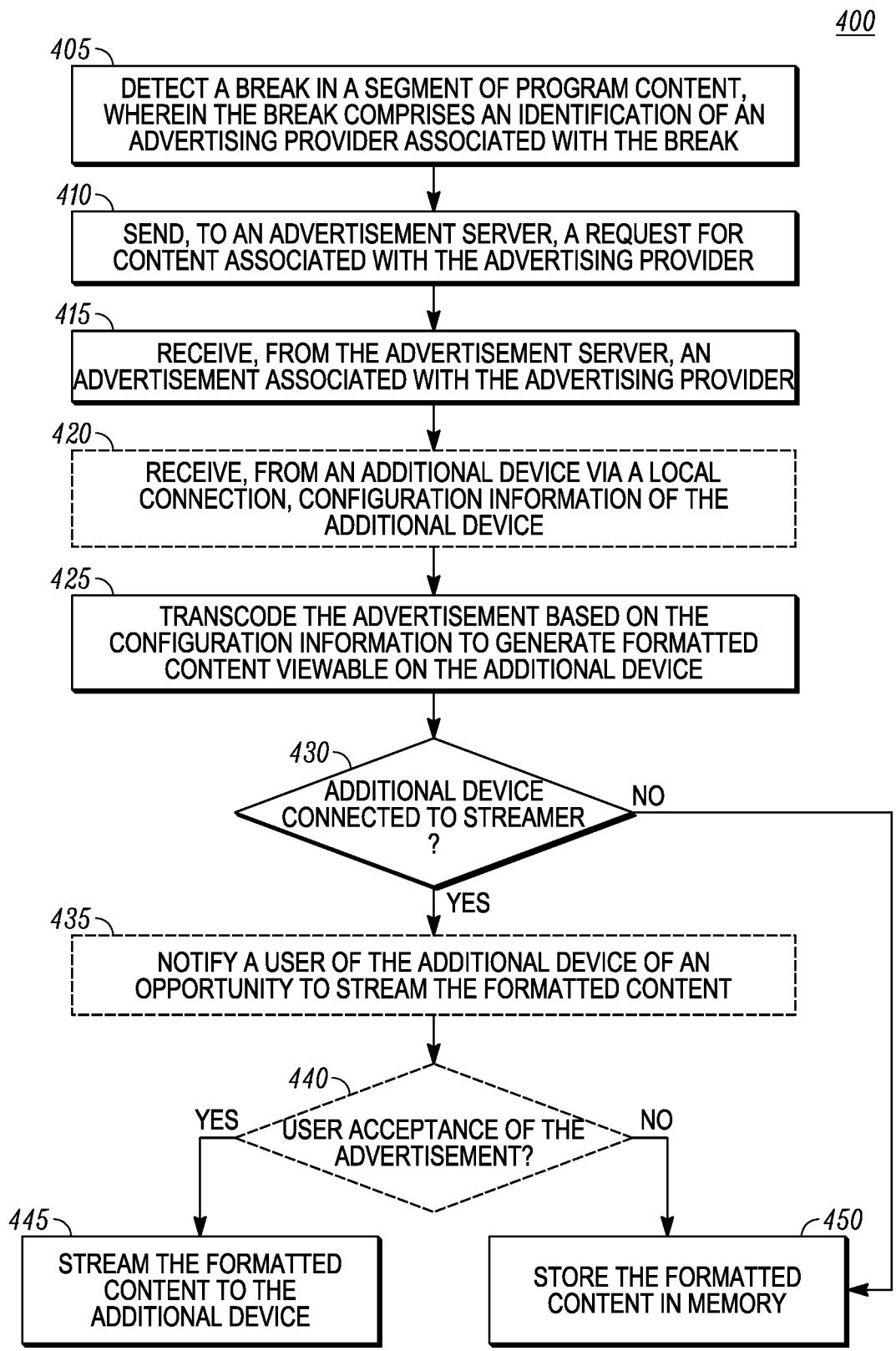
FIG. 4 is a flow diagram depicting targeted content delivery in accordance with some embodiments.

FIG. 4 is a flowchart of a method 400 for a streamer (such as the streamer 155 shown in FIG. 1) to stream an advertisement to an additional device. The method 400 begins with the streamer detecting 405 a break in a segment of program content, wherein the break includes an identification of an advertising provider associated with the break. In some cases, the break can be the initial content received from an STB or other component. For example, some television programs start with one or more advertisements. The streamer sends 410, to an advertisement server, a request for content associated with the advertising provider. The request can optionally include user preferences and/or demographics associated with one or more users of the additional device.

The streamer receives 415, from the advertisement server, an advertisement associated with the advertising provider. In some cases, the streamer can receive multiple advertisements that can be based on the user preferences, user demographics, availability, and/or other factors. The streamer optionally receives 420, from the additional device via a local connection, configuration information of the additional device. It should be understood that the configuration information receipt 420 can occur at any time in the method 400, including before the break in the segment of program content is detected. In some cases, the additional device can be configured to provide the configuration information to the streamer automatically upon connecting to the streamer via the local connection.

The streamer transcodes 425 the advertisement based on the configuration information to generate formatted content viewable on the additional device. For example, the formatted content can be based on a media display application of the additional device, a screen size of the additional device, and/or other configuration parameters. The streamer determines 430 whether the additional device is connected to the streamer, for example via the local connection. If the additional device is not connected to the streamer, then the streamer stores 450 the formatted content in memory. After storing the formatted content, in some cases, the streamer can monitor for the additional device connecting to the streamer. In contrast, if the additional device is connected to the streamer, then the streamer optionally notifies 435 a user of the additional device of an opportunity to receive a stream of the formatted content. For example, the streamer can prompt the additional device to display an alert or similar notification that queries the user as to whether the user would like to view the advertisement.

The streamer then optionally determines 440 whether the user has accepted to view the advertisement. If the user has not accepted to view the advertisement, then the streamer stores 450 the formatted content in memory. After storing the formatted content, in some cases, the streamer can monitor for the user subsequently accepting to view the advertisement. If the user accepts to view the advertisement, then the streamer streams 445 the formatted content to the additional device. For example, a media application on the mobile device can play the advertisement as the data is received from the streamer. In some cases, the media application can play exclusively the advertisement, or can play the advertisement along with the program content being output by an associated STB (either as a single spliced stream of program content and the advertisement or as two individual streams—one with program content and another with the advertisement).

Figure 5:
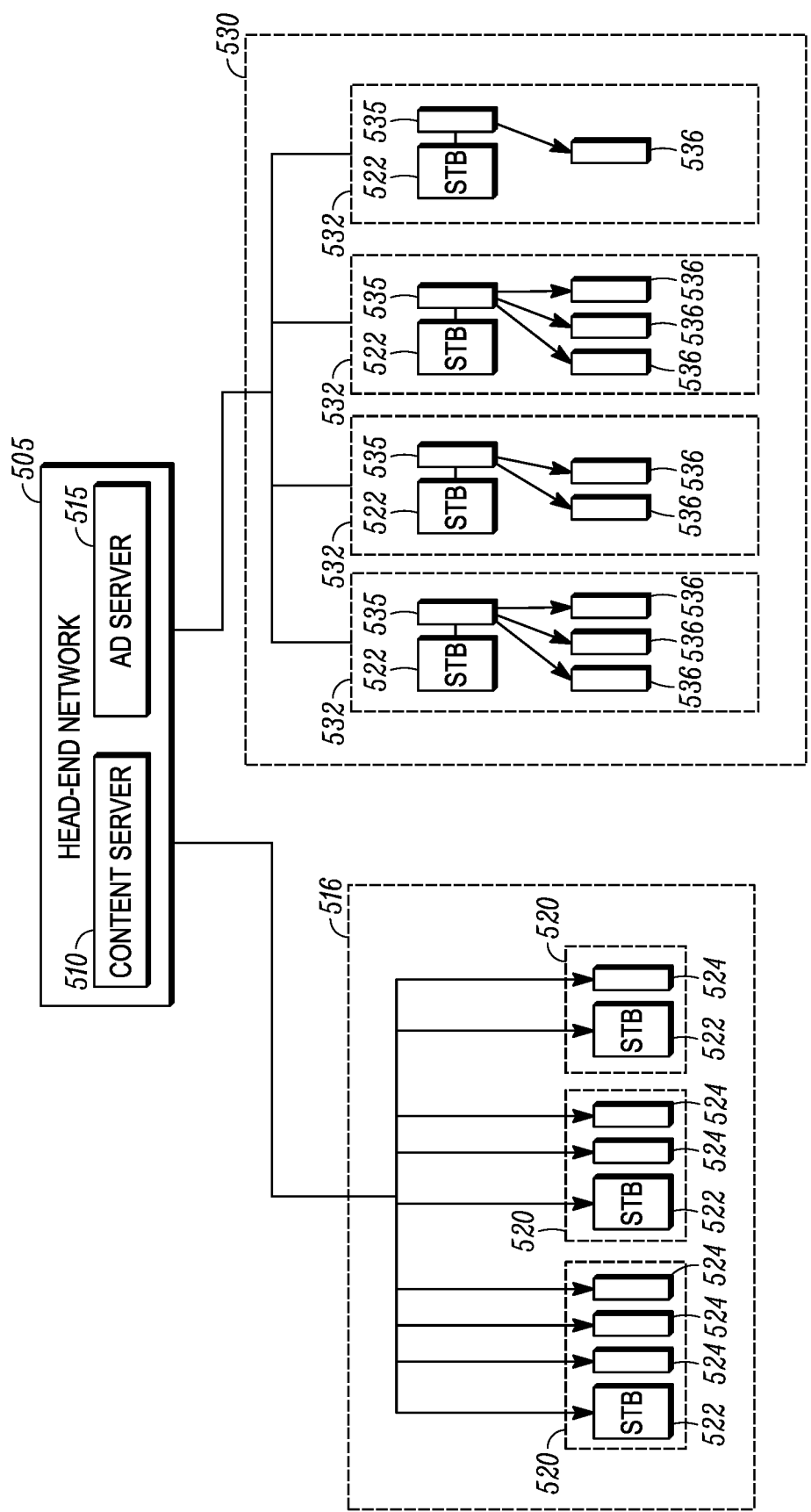
FIG. 5 is a block diagram depicting various advantages of an exemplary content delivery environment in accordance with some embodiments.

FIG. 5 is a diagram illustrating various benefits of the systems and methods as discussed herein. In particular, 516 details components of existing content delivery environments. As shown in FIG. 5, a set of households 520 and devices thereof can connect to a head-end network 505, such as the head-end network 105 as described with respect to FIG. 1. Each of the set of households 520 can have an STB 522 that can receive program content from a content server 510 and advertising content from an ad server 515. Further, each of the set of households 520 can have one or more additional devices 524 that can also receive program content from the content server 510 and advertising content from the ad server 515. Still further, each of the set of households 520 can include a MoCA network and an IP network (not shown in figures). In particular, the head-end network 505 can transmit programming content and advertisement content to the respective STB 522 via the MoCA network, and the head-end network 105 can transmit programming content and advertisement content to the one or more additional devices 524 via the IP network.

There are shortcomings in the existing environment 516, however. In particular, multiple users of the same household 520 may access the same content on the STB 522 and/or the one or more additional devices 524. Therefore, the multiple users may be provided with the same set of advertisements with the content, even if the set of advertisements are not targeted or otherwise relevant to one or more of the multiple users. Further, the same user may view the same content multiple times on the STB 522 and/or the on one or more additional devices 524. Therefore, the same user will be provided with the same set of advertisements over multiple viewings.

Further, the existing environment 516 is scaled based on the number of devices. For instance, each STB 522 must connect to the head-end network 505 via the local MoCA network, and each additional device 524 must connect to the head-end network 505 via the IP network. If the content was tailored for each device in the household, the total traffic to the household would be equivalent to the number of devices (STBs 522 and additional devices 524) in the household multiplied by the program content traffic plus the targeted content traffic. Therefore, there exists a significant amount of data transmission via the MoCA networks and IP networks.

In contrast, in an environment 530 according to the systems and methods as described herein, the STB 522 in each of a set of households 532 can be configured to connect to a streamer 535 in each of the set of households 532. Further, each of a set of additional devices 536 can be configured to connect to the streamer 535 via a local connection such as a wireless local area network. By incorporating the streamer 535, the data transmission to and from the head-end network 505 is scaled based on the number of households 532. More particularly, instead of each of the set of additional devices 536 receiving program and/or advertising content directly from the head-end network 505, the streamer 535 in each of the set of households 532 distributes the program and/or advertising content to each of the set of additional devices 536. Thus, if the content was tailored for each device in the household, the total traffic to the household would be equivalent to the number of devices (STBs 522 and additional devices 524) in the household multiplied by the targeted content traffic and then added to the program content traffic (without multiplication of the program content traffic for each device). Therefore, the amount of data transmission to and from the head-end network 505 can be significantly reduced. Further, the content provided to the set of additional devices 536 can be tailored to the specifications of the set of additional devices 536 and/or the preferences of the individual users.

Thus, it should be clear from the preceding disclosure that the present invention provides a method and apparatus in a communication system to distribute targeted content to a set of devices. The method and apparatus advantageously allows an advertising provider to utilize an advertisement slot more effectively and efficiently. The method and apparatus further advantageously allows users to receive relevant advertisement content.

This disclosure is intended to explain how to fashion and use various embodiments in accordance with the invention rather than to limit the true, intended, and fair scope and spirit thereof. The foregoing description is not intended to be exhaustive or to limit the invention to the precise forms disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method in an electronic communication device, the method comprising:
   receiving a first media content stream;
   receiving configuration information corresponding to a media playback device;
   detecting, by the electronic communication device, a break in the first media content stream;
   in response to detecting the break in the first media content stream, transmitting, from the electronic communication device to a server, a request for supplemental content that includes the configuration information and user preference information corresponding to a user account associated with the media playback device;
   receiving the supplemental content in response to the transmitted request;
   transcoding the supplemental content based on the configuration information to generate a second media content stream containing formatted supplemental content; and
   transmitting the second media content stream containing the formatted supplemental content to the media playback device.

2. The method of claim 1, wherein the electronic communication device is a streaming device and wherein the media playback device is a mobile device connected to the streaming device over a local area network.

3. The method of claim 1, wherein the configuration information comprises screen property information of the media playback device and communication protocol information used by the media playback device.

4. The method of claim 1, wherein the second media content stream containing the formatted supplemental content replaces a portion of the first media content stream at the detected break.

5. The method of claim 1, wherein the second media content stream containing the formatted supplemental content is transmitted to the electronic communication device over a local area network using a communication protocol information.

6. The method of claim 1, wherein the break comprises an identifier for supplemental content of a content provider associated with the break.

7. The method of claim 6, wherein detecting the break in the first media content stream further comprises receiving metadata from the media playback device that identifies the content provider.

8. The method of claim 1, wherein the supplemental content is selected based on the configuration information and the user preference information.

9. The method of claim 1, wherein transmitting the second media content stream containing the formatted supplemental content to the media playback device further comprises:
- receiving an indication of the media playback device connecting to the electronic communication device over a local area network;
- retrieving the second media content stream containing the formatted supplemental content from a storage device; and
- streaming the second media content stream containing the formatted supplemental content to the media playback device in response to receiving the indication of the media playback device connecting to the electronic communication device.

10. The method of claim 1, wherein transmitting the second media content stream containing the formatted supplemental content to the media playback device further comprises:
- transmitting a notification to the media playback device of an availability to receive the second media content stream containing the formatted supplemental content;
- receiving a response to the notification to receive the second media content stream containing the formatted supplemental content at the media playback device; and
- streaming the second media content stream containing the formatted supplemental content to the media playback device in response to receiving the response to the notification.

11. A system comprising:
- a hardware processor of an electronic communication device that is configured to:
  - receive a first media content stream;
  - receive configuration information corresponding to a media playback device;
  - detect, by the electronic communication device, a break in the first media content stream;
  - in response to detecting the break in the first media content stream, transmit, from the electronic communication device to a server, a request for supplemental content that includes the configuration information and user preference information corresponding to a user account associated with the media playback device;
  - receive the supplemental content in response to the transmitted request;
  - transcode the supplemental content based on the configuration information to generate a second media content stream containing formatted supplemental content; and
  - transmit the second media content stream containing the formatted supplemental content to the media playback device.

12. The system of claim 11, wherein the electronic communication device is a streaming device and wherein the media playback device is a mobile device connected to the streaming device over a local area network.

13. The system of claim 11, wherein the configuration information comprises screen property information of the media playback device and communication protocol information used by the media playback device.

14. The system of claim 11, wherein the second media content stream containing the formatted supplemental content replaces a portion of the first media content stream at the detected break.

15. The system of claim 11, wherein the second media content stream containing the formatted supplemental content is transmitted to the electronic communication device over a local area network using a communication protocol information.

16. The system of claim 11, wherein the break comprises an identifier for supplemental content of a content provider associated with the break.

17. The system of claim 16, wherein detecting the break in the first media content stream further comprises receiving metadata from the media playback device that identifies the content provider.

18. The system of claim 11, wherein the supplemental content is selected based on the configuration information and the user preference information.

19. The system of claim 11, wherein transmitting the second media content stream containing the formatted supplemental content to the media playback device further comprises:
- receiving an indication of the media playback device connecting to the electronic communication device over a local area network;
- retrieving the second media content stream containing the formatted supplemental content from a storage device; and
- streaming the second media content stream containing the formatted supplemental content to the media playback device in response to receiving the indication of the media playback device connecting to the electronic communication device.

20. The system of claim 11, wherein transmitting the second media content stream containing the formatted supplemental content to the media playback device further comprises:
- transmitting a notification to the media playback device of an availability to receive the second media content stream containing the formatted supplemental content;
- receiving a response to the notification to receive the second media content stream containing the formatted supplemental content at the media playback device; and
- streaming the second media content stream containing the formatted supplemental content to the media playback device in response to receiving the response to the notification.

21. A non-transitory computer-readable medium containing computer-executable instructions that, when executed by a hardware processor, cause the hardware processor to perform a method in an electronic communication device, the method comprising:
- receiving a first media content stream;
- receiving configuration information corresponding to a media playback device;
- detecting, by the electronic communication device, a break in the first media content stream;
- in response to detecting the break in the first media content stream, transmitting, from the electronic communication device to a server, a request for supplemental content that includes the configuration information and user preference information corresponding to a user account associated with the media playback device;
- receiving the supplemental content in response to the transmitted request;
- transcoding the supplemental content based on the configuration information to generate a second media content stream containing formatted supplemental content; and transmitting the second media content stream containing the formatted supplemental content to the media playback device.

\* \* \* \* \*